(12) United States Patent
Bao et al.

(10) Patent No.: US 10,680,936 B2
(45) Date of Patent: *Jun. 9, 2020

(54) DETERMINING SHORTCUT RULES FOR BYPASSING WAYPOINT NETWORK DEVICE(S)

(71) Applicant: INTERNATIONAL BUSINESS MACHINES CORPORATION, Armonk, NY (US)

(72) Inventors: Lei Bao, Wuxi (CN); Liang Rong, Wuxi (CN); Gang Tang, Nanjing (CN); Zi Jin Tao, Wuxi (CN); Ming Shuang Xian, Wuxi (CN)

(73) Assignee: International Business Machines Corporation, Armonk, NY (US)

(*) Notice: Subject to any disclaimer, the term of this patent is extended or adjusted under 35 U.S.C. 154(b) by 166 days.

This patent is subject to a terminal disclaimer.

(21) Appl. No.: 15/852,440

(22) Filed: Dec. 22, 2017

(65) Prior Publication Data

US 2018/0139121 A1 May 17, 2018

Related U.S. Application Data

(63) Continuation of application No. 14/741,832, filed on Jun. 17, 2015, now Pat. No. 9,996,176.

(51) Int. Cl.
*G06F 15/173* (2006.01)
*H04L 12/707* (2013.01)
*H04L 29/06* (2006.01)

(52) U.S. Cl.
CPC .......... *H04L 45/22* (2013.01); *H04L 65/4069* (2013.01)

(58) Field of Classification Search
CPC .............................. H04L 45/22; H04L 65/4069

(Continued)

(56) References Cited

U.S. PATENT DOCUMENTS 6,374,079 B1* 4/2002 Hsu .................... H04B 7/18576
 455/11.1
6,687,732 B1* 2/2004 Bector .............. H04L 29/12009
 709/200

(Continued)

OTHER PUBLICATIONS

Stefano Salsano et al. "Generalized Virtual Networking: An Enabler for Service Centric Networking and Network Function Virtualization" 2014.

(Continued)

*Primary Examiner* — Liang Che A Wang
(74) *Attorney, Agent, or Firm* — Isaac J. Gooshaw, Esq.; George S. Blasiak, Esq.; Heslin Rothenberg Farley & Mesiti PC

(57) ABSTRACT

Methods, computer program products, and systems are presented. The methods include, for instance: obtaining, by one or more processor, metadata of at least one packet of a network stream; and determining, by the one or more processor, a shortcut rule for the network stream to bypass at least one waypoint network, the shortcut rule being determined using the metadata of the at least one packet of the network stream. In one embodiment, the obtaining includes obtaining the metadata from the at least one waypoint network. In another embodiment, the obtaining comprises obtaining the metadata from multiple packets of the network stream, and the determining comprises using the metadata of the multiple packets of the network stream to determine the shortcut rule. In a further embodiment, the determining includes analyzing a header of the at least one packet of the network stream.

20 Claims, 7 Drawing Sheets

(58) Field of Classification Search
USPC .................. 709/217, 218, 219, 238, 239
See application file for complete search history.

(56) References Cited

U.S. PATENT DOCUMENTS

| | | | |
|---|---|---|---|
| 8,830,834 B2 | 9/2014 | Sharma et al. | |
| 9,106,769 B2 | 8/2015 | Kanode et al. | |
| 9,413,667 B2* | 8/2016 | Beliveau | H04L 47/122 |
| 9,729,439 B2 | 8/2017 | MeLampy et al. | |
| 2006/0248002 A1* | 11/2006 | Summer | G06Q 10/00 |
| | | | 705/38 |
| 2012/0030750 A1* | 2/2012 | Bhargava | H04L 63/02 |
| | | | 726/13 |
| 2014/0140202 A1* | 5/2014 | Layman | H04L 41/5009 |
| | | | 370/221 |
| 2014/0215074 A1 | 7/2014 | Zhang et al. | |
| 2014/0233385 A1 | 8/2014 | Beliveau et al. | |
| 2014/0307744 A1 | 10/2014 | Dunbar et al. | |
| 2014/0317261 A1 | 10/2014 | Shatzkamer et al. | |
| 2014/0344439 A1 | 11/2014 | Kempf et al. | |
| 2015/0271729 A1* | 9/2015 | Sirotkin | H04W 48/00 |
| | | | 370/332 |
| 2016/0006755 A1* | 1/2016 | Donnelly | H04L 63/0263 |
| | | | 726/1 |
| 2016/0164780 A1 | 6/2016 | Timmons et al. | |
| 2016/0164835 A1* | 6/2016 | Hoffmann | H04L 63/0272 |
| | | | 726/1 |
| 2016/0285828 A1* | 9/2016 | Keohane | H04L 63/0245 |
| 2016/0373340 A1 | 12/2016 | Bao et al. | |

OTHER PUBLICATIONS

Zafar Ayyub Qazi et al. "SIMPLE-fying Middlebox Policy Enforcement Using SDN" pp. 27-38.
R. Krishnan et al. "SFC Long-Lived Flow Use Cases," Feb. 6, 2015, pp. 1-10.
Non-Final Rejection of U.S. Appl. No. 14/741,832, filed Jun. 17, 2015 dated Mar. 24, 2017.
Applicant's Response to Non-Final Rejection of U.S. Appl. No. 14/741,832, filed Jun. 17, 2015, dated Jun. 26, 2017.
Notice of Allowance and Fees Due for U.S. Appl. No. 14/741,832, filed Jun. 17, 2015 dated Aug. 2, 2017.
Applicant's Request for Continued Examination for U.S. Appl. No. 14/741,832, filed Jun. 17, 2015, dated Oct. 27, 2017.
List of IBM Patent and/or Patent Applications treated as related for U.S. Appl. No. 15/852,440, filed Dec. 22, 2017, dated Jan. 16, 2018.

* cited by examiner

DETERMINING SHORTCUT RULES FOR BYPASSING WAYPOINT NETWORK DEVICE(S)

CROSS-REFERENCE TO RELATED APPLICATION

This application claims the benefit of priority of U.S. patent application Ser. No. 14/741,832 filed Jun. 17, 2015, entitled, "Determining Shortcut Rules for Bypassing Waypoint Network Device(s)," the entirety of which is hereby incorporated herein by reference.

TECHNICAL FIELD

The present disclosure relates to virtualization technologies, including virtual networking and virtual computing, and more particularly to determining shortcut rules for bypassing waypoint network devices. For example, the waypoint networks can be waypoint networks of a service chain.

BACKGROUND

Software defined networking and virtualization technologies allow, for example, networking functions previously performed in a single network device, such as a switch, router, firewall, or security device, to be separated and virtualized for operation across a virtual network and/or over many virtual machines. For instance, these networking functions can be separated and hosted on separate waypoint network devices which are virtualized and located on separate computing nodes. Such a configuration allows for dynamically increasing or decreasing the amount of computing resources devoted to performing specific networking functions in response to changing demand during ongoing operation. By contrast, traditional methods using specific fixed hardware devices, such as dedicated firewalls or dedicated address translation devices, can be inefficient, as some fixed devices may have excess capacity and other fixed devices may be fully utilized. Software defined networking can alleviate such a situation by allowing networking functions to run in virtual machines which can be launched in real-time to meet increased demand, rather than devoting fixed hardware to the networking functions based on out of date estimates.

In a software defined network infrastructure, network peers, clients, or servers, which may run on physical machines or virtual machines, can communicate by establishing a network stream or session. The network stream, which includes numerous network packets, may pass through numerous network devices, such as the waypoint network devices described above, which can perform one or more networking functions on the network stream. Depending on the desired networking functions, the network stream can be configured to pass through one, two, three, or more waypoint network devices, and each waypoint network device can perform its networking function on the network packets of the network stream. For example, a network stream can pass sequentially through a firewall waypoint network device, a load balancer waypoint network device, and an encryption waypoint network device.

However, in order for a network stream to pass through multiple waypoint network devices in overlay networks, the network stream may need to exit the underlay physical network cloud, enter one waypoint network device, return to the underlay physical network cloud, enter another waypoint network device, return to the underlay physical network cloud again, etc. Each traversal between the network cloud and a waypoint network device makes use of bandwidth and increases the latency delay of packets of the network stream. Therefore, a need exists of technological solution to improve the functioning of software defined networking, for example, by optimizing bandwidth consumption of network streams traversing waypoint network devices.

SUMMARY

Shortcomings of the prior art are overcome and additional advantages are provided through the provision, in one aspect, of a method. The method includes, for instance, obtaining, by one or more processor, metadata of at least one packet of a network stream. In addition, the method includes determining, by the one or more processor, a shortcut rule for the network stream to bypass at least one waypoint network device. Further, the shortcut rule can be determined using the metadata of the at least one packet of the network stream. For example, the method can reduce consumption of network bandwidth and improve latency.

In one embodiment, the obtaining includes obtaining the metadata from the at least one waypoint network device. For example, once a waypoint network device decides to deny a stream of packets, the shortcut rule for this network stream can be immediately determined and all packets in this network stream can be dropped at the sending virtual switch to bypass all waypoint network devices.

In another embodiment, the obtaining includes, for instance, obtaining the metadata from multiple packets of the network stream. In addition, the determining includes using the metadata of the multiple packets of the network stream to determine the shortcut rule. For example, the method can use metadata after multiple packets of the network stream visit waypoint network devices in a service chain in order to support bypassing waypoint network devices that perform complex network functions and require multiple packets to determine the policy or shortcut rule for the network stream.

In another embodiment, the determining includes analyzing a header of the at least one packet of the network stream. For example, the method can use address information located in the header to determine whether a waypoint network device can be bypassed.

In another aspect, a computer program product is provided. The computer program product includes a computer readable storage medium readable by one or more processor and storing instructions for execution by the one or more processor for performing a method. The method includes, for instance, obtaining, by one or more processor, metadata of at least one packet of a network stream. In addition, the method includes determining, by the one or more processor, a shortcut rule for the network stream to bypass at least one waypoint network device. Further, the shortcut rule may be determined using the metadata of the at least one packet of the network stream. For example, the computer program product can reduce consumption of network bandwidth and improve latency.

In a further aspect, a system is provided. The system includes, for instance a memory. In addition, the system includes one or more processor in communication with the memory. Further, the system includes program instructions executable by the one or more processor via the memory to perform a method. The method includes, for instance, obtaining, by the one or more processor, metadata of at least one packet of a network stream. In addition, the method includes determining, by the one or more processor, a shortcut rule for the network stream to bypass at least one waypoint network. Further, the shortcut rule is determined using the metadata of the at least one packet of the network stream.

Additional features and advantages are realized through the techniques set forth herein. Other embodiments and aspects are described in detail herein and are considered a part of the claimed invention.

BRIEF DESCRIPTION OF THE DRAWINGS

One or more aspects of the present disclosure are particularly pointed out and distinctly claimed as examples in the claims at the conclusion of the specification. The foregoing and other objects, features, and advantages of the present disclosure are apparent from the following detailed description taken in conjunction with the accompanying drawings in which:

DETAILED DESCRIPTION

Figure 1:
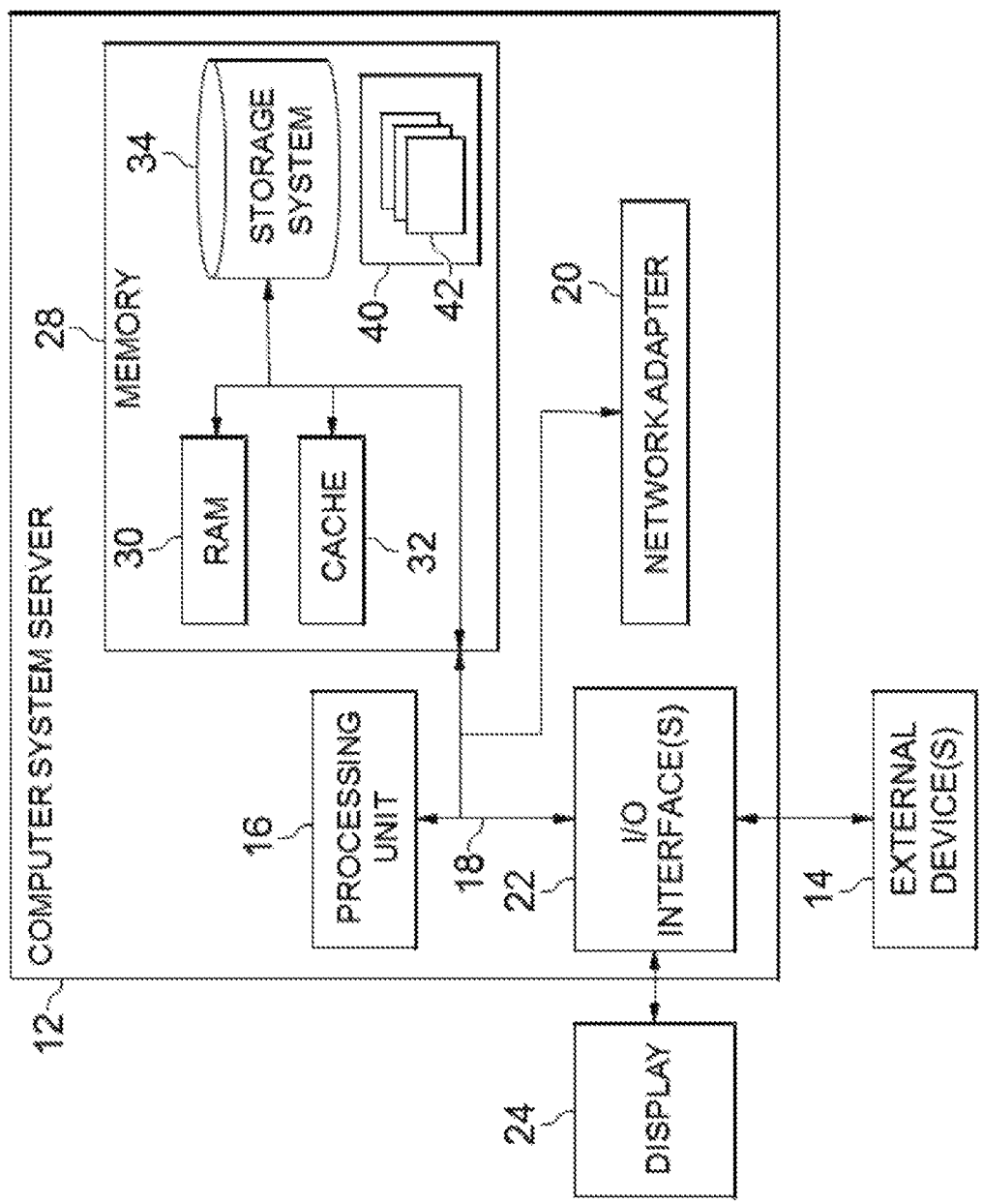
FIG. 1 depicts a cloud computing node according to an embodiment of the present invention.

Aspects of the present disclosure and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the disclosure in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

The present disclosure provides, in part, methods, computer programs, computer systems, network devices, and network policy devices for determining shortcut rules for bypassing waypoint network devices. Demand continues for software defined networking technologies, which can allow the separation of previously linked networking functions into separate computing units. These separate networking functions can be performed on separate waypoint network devices located on separate waypoint networks.

In certain cases, some of the network functions can be accomplished by a waypoint network device examining a relatively small number of network packets of the network stream during an initial period of time. For instance, a simple firewall rule to admit or deny a network session based on source and destination internet protocol (IP) addresses and application protocol could perform its function after only a single packet of the network stream has been examined by a waypoint network device performing a firewall networking function. In another example, the waypoint network device may be able to complete its network function after inspecting several network packets of the network stream. In either such example, although the waypoint network device may have completed its network function, the network stream will continue to traverse trough the waypoint network device on the waypoint network, needlessly using network bandwidth.

Advantageously, the present disclosure allows, for example, bypassing a waypoint network after a waypoint network device located therein has finished performing a networking function on a network stream. Thus, the present technique allows for the advantages of software defined networking, such as separation and virtualization of network functions, without sacrificing bandwidth and latency.

Reference is made below to the drawings, which are not drawn to scale for ease of understanding, wherein the same reference numbers used throughout different figures designate the same or similar components.

FIGS. 1-4 depict various aspects of computing, including cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
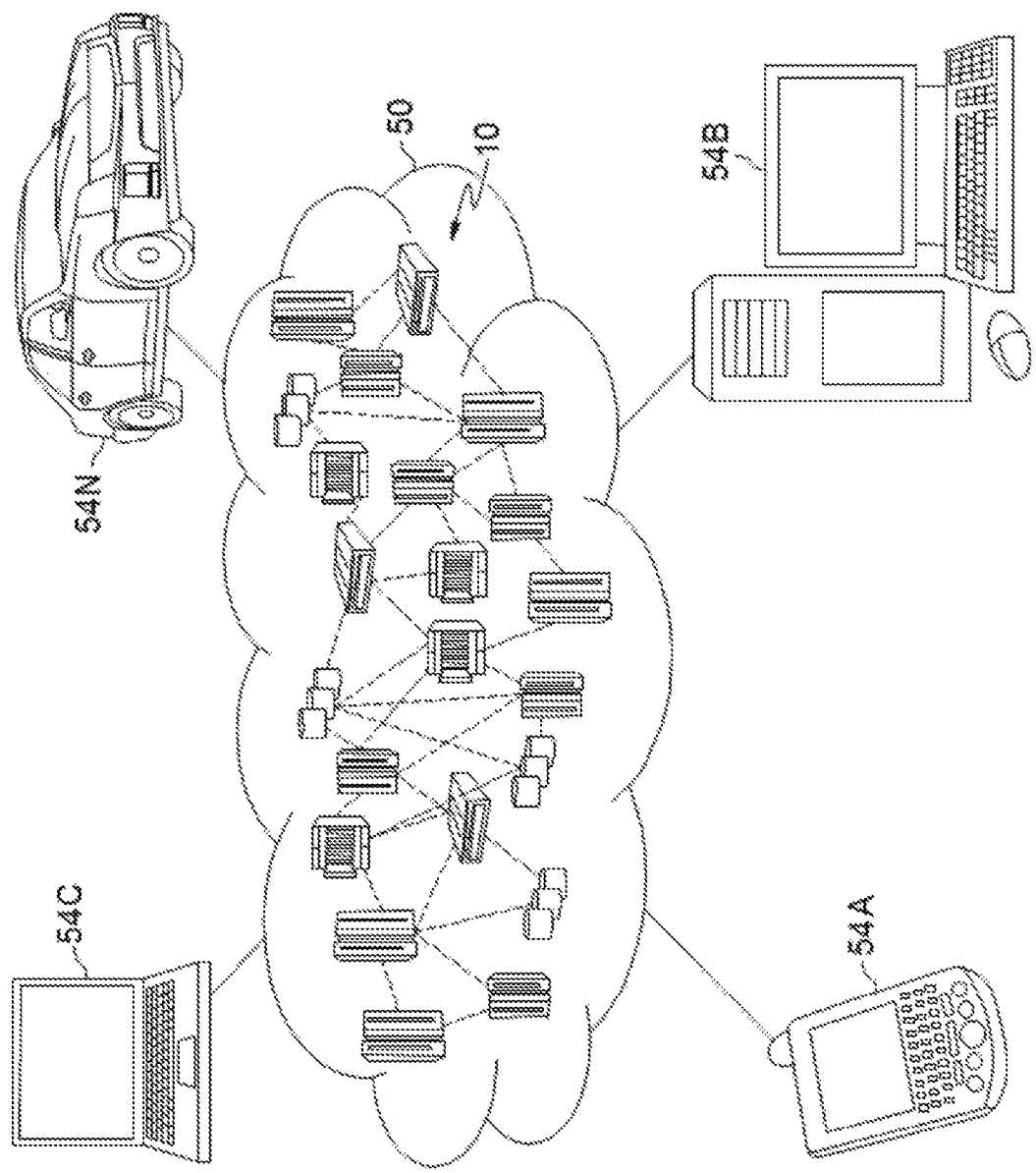
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
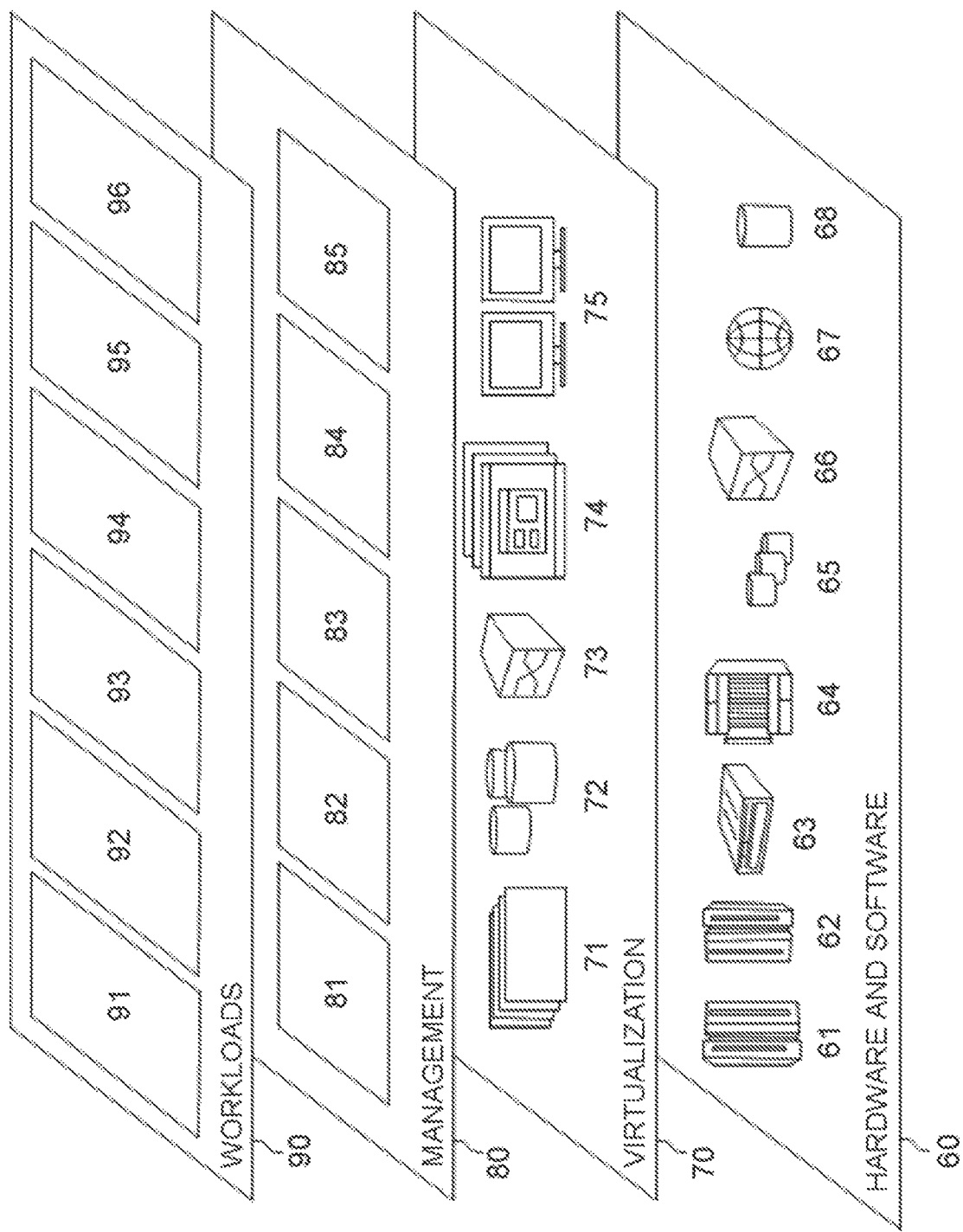
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and determining shortcut rules for bypassing waypoint network devices 96 as described herein.

Figure 4:
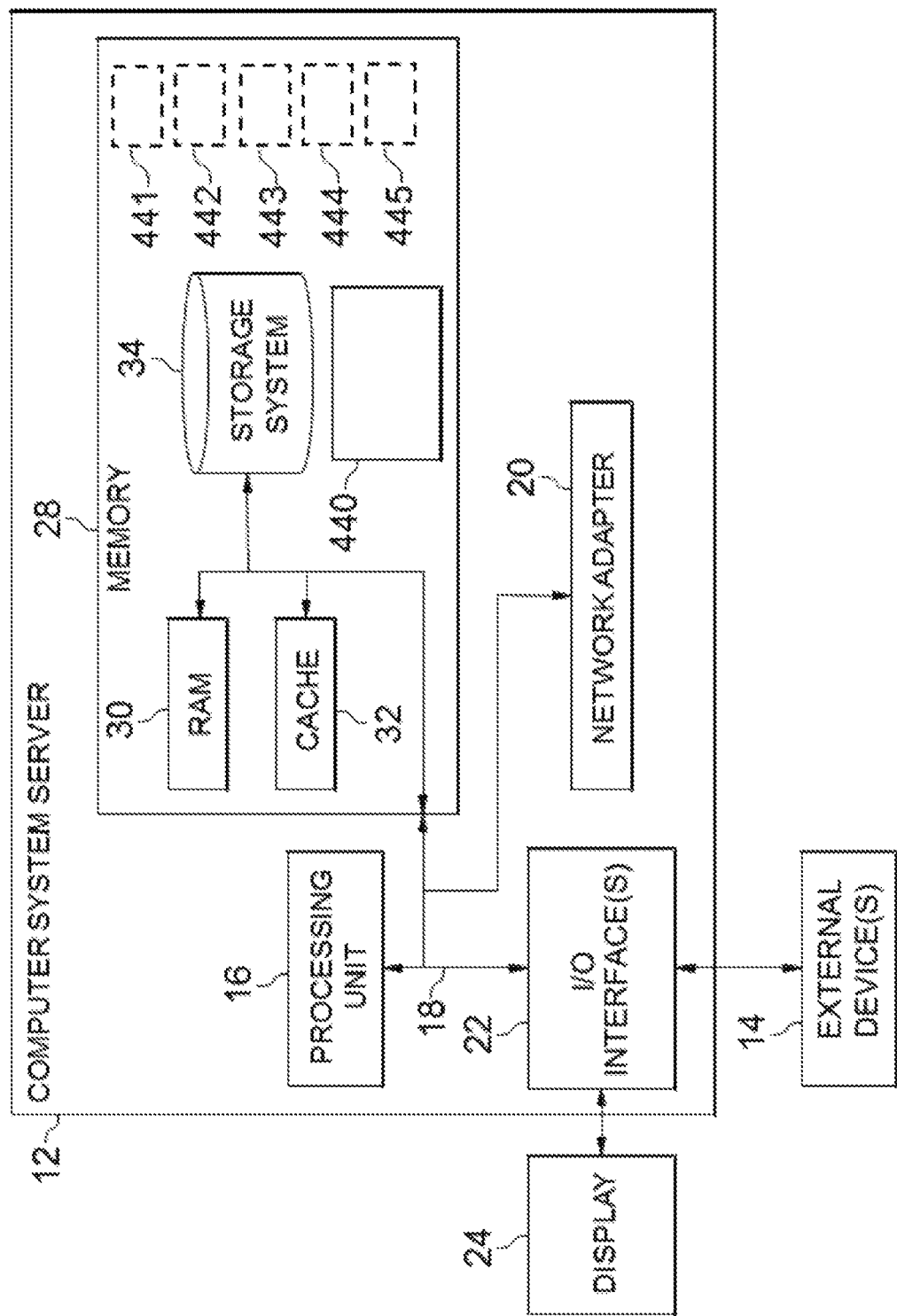
FIG. 4 depicts a hardware overview of a computing node, in accordance with one or more aspects set forth herein.

FIG. 4 depicts a hardware overview of a computing node 10, which may be a cloud computing node, a network device 120, 120-S, 120-D, 120-A, 120-B (FIG. 5), a network policy device 125 (FIG. 5), and/or a computing node 130 (FIG. 5), in accordance with one or more aspects set forth herein.

Program/utility 40 as set forth in FIG. 1 can include one or more program 440 as set forth in FIG. 4, and program/utility 40 as set forth in FIG. 1 can optionally include some or all of one or more program 441, 442, 443, 444, 445.

One or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 (and optionally at least one of one or more program 441, 442, 443, 444, 445) generally carry out the functions and/or methodologies of embodiments of the invention as described herein.

Referring again to FIG. 4:

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
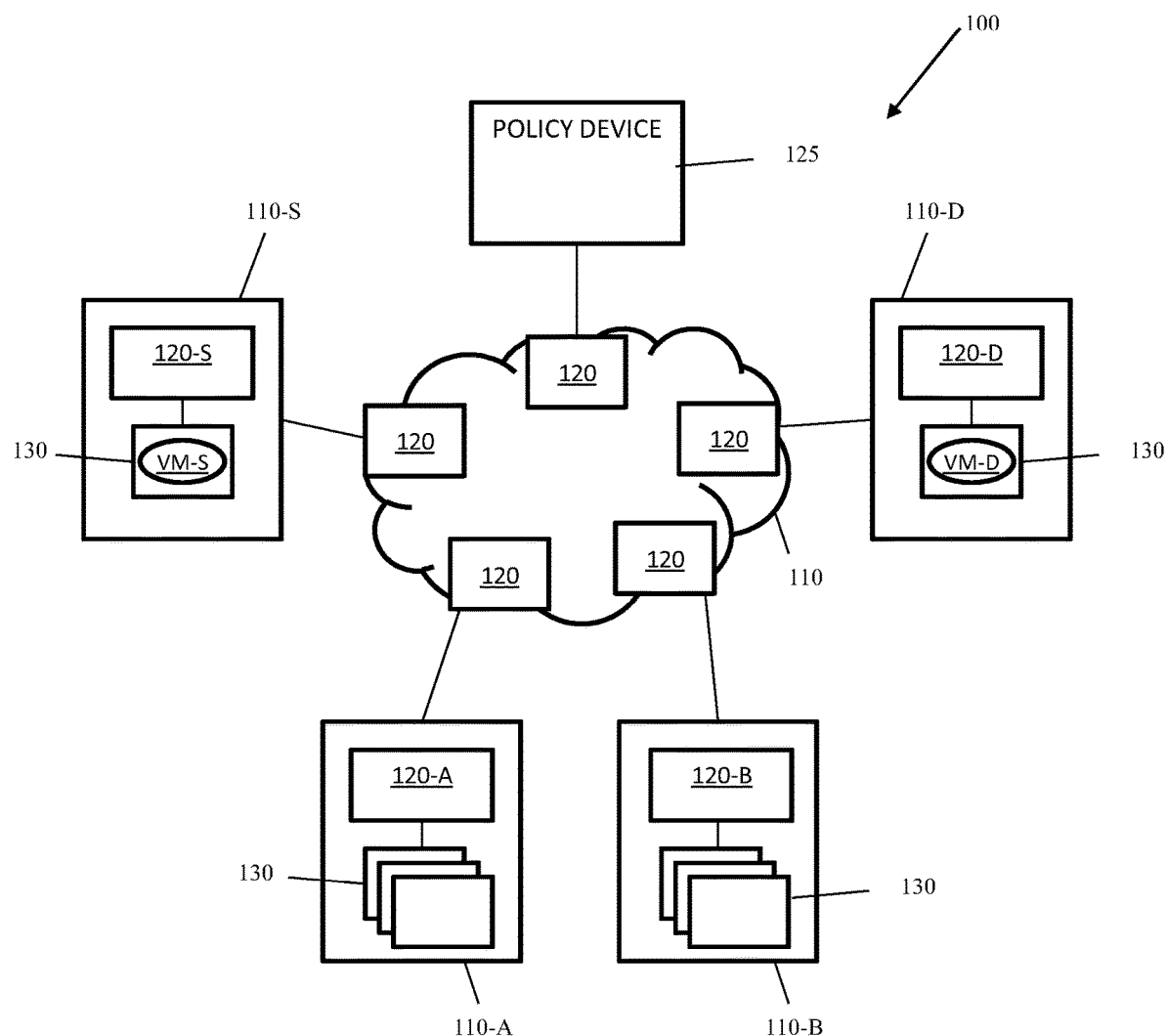
FIG. 5 is an exemplary block diagram of a system, in accordance with one or more aspects set forth herein.

FIG. 5 is an exemplary block diagram of a system 100, in accordance with one or more aspects set forth herein. In the embodiment of FIG. 5, system 100 includes numerous networks 110, 110-S, 110-D, 110-A, 110-B, which may be physical networks or virtual networks. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

By way of explanation, FIG. 5 depicts an example environment in which a source network 110-S is connected to a destination network 110-D through a network cloud. In some of the examples to follow, a network stream may be established between source network 110-S and destination network 110-D. Waypoint network 110-A and waypoint network 110-B may be used to perform desired networking functions.

In one embodiment, a network, e.g., a network 110, 110-S, 110-D, 110-A, 110-B, connects to one or more network devices, e.g., network devices 120, 120-S, 120-D, 120-A, 120-B, and one or more computing nodes, e.g., computing nodes 130. For example, network device 120 can be a network edge device, such as a network switch or network router, and can operate at one or more network protocol layers, such as layer 2 (L2), layer 3 (L3), or layers 4-7 (L4-L7). In another example, network device 120 can combine the features of network switches and network routers. In general, each of network device 120 and computing node 130 can be or include a computing node 10 (FIG. 4), details of which are described below.

In one embodiment, a network policy device 125 can be included, so that control plane information between network devices 120 may be communicated. In one example, network policy device 125 can be one of the network devices 120 provisioned with software to perform the functions noted below with respect to network policy device 125. In the embodiment of FIG. 5, network policy device 125 is shown as a separate device.

It should be understood that to most clearly explain the present techniques, networks 110, 110-S, 110-D, 110-A, 110-B are described and referred to as networks. In practice, the networks are embodied by physical machines that can be or include computing nodes as described herein, and can host multiple virtual machines and waypoints. In some examples, a network can include one physical machine, and in other examples, a network can include more than one physical machine.

In one embodiment, computing nodes 130 can each have one or more virtual machines, e.g., virtual machines VM-S, VM-D. For example, a virtual machine VM-S is a software computer that can run an operating system and applications, and can have access to virtual devices. In addition, a virtual machine can span more than one physical machine, and numerous virtual machines can exist on the same set of physical machines. From the standpoint of a client, such as another virtual machine or physical machine, communication and interaction with a virtual machine proceeds just as with physical machines. Continuing with reference to the embodiment of FIG. 5, a virtual machine VM-S can establish communication with a virtual machine VM-D. For example, virtual machine VM-S can be located on network 110-S and virtual machine VM-D can be located on network 110-D. In addition, physical communication can take place using virtual overlay network devices 120-S, 120-D, logically on top of underlying physical network devices 120.

By way of example, a network stream can be established between virtual machine VM-S on source network 110-S and virtual machine VM-D on destination network 110-D. In such a case, the network stream may traverse waypoint network 110-A, and computing node 130 of waypoint network 110-A may be provisioned with a virtual machine for performing a network function on the network stream. Similarly, the network stream may next traverse waypoint network 110-B, and computing node 130 of waypoint network 110-B may be provisioned with a virtual machine for performing a network function on the network stream. Details of such interactions will be provided below with respect to FIG. 7.

Figure 6:
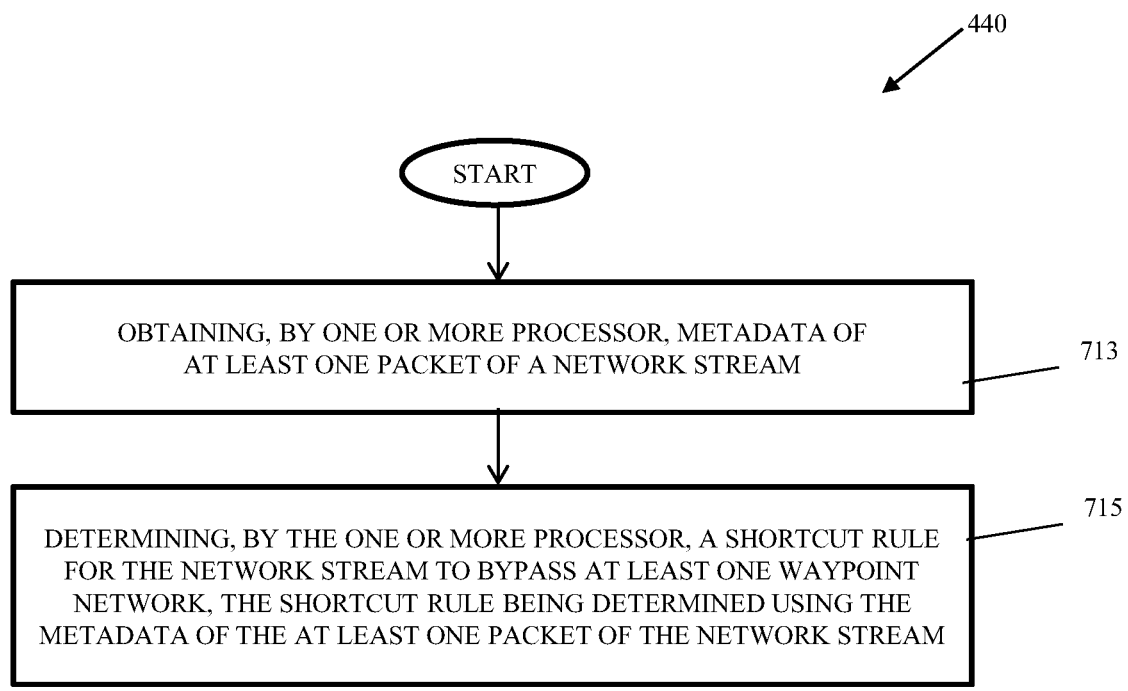
FIG. 6 depicts embodiments of processes for determining shortcut rules, in accordance with one or more aspects set forth herein.

FIG. 6 depicts embodiments of processes for updating networks, in accordance with one or more aspects set forth herein. By way of example, the processes described with respect to FIG. 6 can be performed using one or more program 440 on one or more network policy device 125 (FIG. 5), as detailed with respect to FIG. 4.

In the embodiment of FIG. 6, one or more program 440 at block 713 obtains metadata of at least one packet of a network stream; and one or more program 440 at block 715 determines a shortcut rule for the network stream to bypass at least one waypoint network device, the shortcut rule being determined using the metadata of the at least one packet of the network stream.

For instance, the waypoint network device can be a waypoint network device along a service chain, and the shortcut rule can be determined after the packet visits waypoint network devices along the service chain. In addition, metadata can be or include a formatted service header to be placed after an IP header. In such a case, the metadata can be exchanged between network policy devices and virtual switches or waypoint network devices, and can gather necessary information along waypoint network devices when packets traverse through the service chain.

In one embodiment, the first virtual switch which is closest to the sending virtual machine sends the packet header to network policy device, which creates a footprint rule for the stream and returns packet metadata to the first virtual switch. In addition, the first virtual switch receives the metadata, inserts it into the packet, and sends the packet to a virtual switch connecting to the waypoint. Further, the waypoint receives the packet, and if possible, can determine actions to take on the stream, and updates the actions into the metadata and sends the updated metadata to the network policy device. Next, the waypoint returns the packet to the virtual switch and the virtual switch continues subsequent forwarding.

In response to the network policy device receiving the updated metadata from waypoint, the network policy device will find out the footprint rule of the stream by stream ID in the metadata, and then update the footprint rule with the actions carried in the metadata. If the metadata is reported from the last waypoint along a service chain, the footprint rule will be claimed as the final shortcut rule. For example, the network policy device pushes the final shortcut rule to the first virtual switch.

In one embodiment, one or more program 440 at block 713 obtains the metadata from the at least one waypoint network device.

In one embodiment, one or more program 440 at block 713 obtains the metadata from multiple packets of the network stream, and one or more program 440 at block 715 determines a shortcut rule by using the metadata of the multiple packets of the network stream to determine the shortcut rule.

For instance, metadata can be stateful for a packet, but stateless between different packets in a stream. For example, stateful metadata can mean that for the same packet, the metadata is updated when visiting each waypoint network device. In contrast, stateless metadata can mean that metadata of a prior packet will not be used by a subsequent packet of the network stream. Therefore metadata of multiple packets of a network stream can include first metadata of a first packet, second metadata of a second packet, and so forth.

In one embodiment, one or more program 440 at block 715 determines a shortcut rule by analyzing a header of the at least one packet of the network stream.

In one embodiment, one or more program 440 at block 713 obtains the metadata from the at least one waypoint network device, where the metadata includes deep packet inspection information of the at least one packet of the network stream.

In one embodiment, one or more program 440 at block 713 obtains the metadata from a firewall device of the at least one waypoint network device, and one or more program 440 at block 715 determines a shortcut rule that includes instructions for the network stream to bypass the firewall device of the at least one waypoint network device.

In one embodiment, one or more program 440 at block 713 obtains the metadata from a load balancer device of the at least one waypoint network device, and one or more program 440 at block 715 determines a shortcut rule that includes instructions for the network stream to bypass the load balancer device of the at least one waypoint network device.

In one embodiment, one or more program 440 at block 713 obtains the metadata from multiple waypoint network devices and one or more program 440 at block 715 determines a shortcut rule that includes instructions for the network stream to bypass the multiple waypoint network devices.

In one embodiment, one or more program 440 at block 715 determines a shortcut rule that includes instructions for the network stream to bypass one waypoint network device of the at least one waypoint network device and traverse another waypoint network device of the at least one waypoint network device.

In one embodiment, one or more program 440 at block 713 obtains the metadata from a source network of the network stream.

In one embodiment, one or more program 440 at block 715 determines a shortcut rule that includes instructions for a source network of the network stream to bypass the at least one waypoint network device and route the network stream directly to a destination network.

In one embodiment, one or more program 440 at block 713 obtains the metadata indicating that a firewall has allowed the network stream based on the source and destination addresses and protocols.

In one embodiment, one or more program 440 at block 713 obtains the metadata indicating that a load balancer system has determined which destination virtual machine to connect the source virtual machine to, and that such determination is final for that network stream, and there is no longer any need for the load balancer to service the network stream.

In one embodiment, one or more program 440 at block 713 obtains the metadata by receiving information that indicates that a network intrusion detection or prevention system has analyzed one or more network packets of the network stream, and determined that the network stream may be considered safe to pass through the network.

In one embodiment, metadata is a formatted service header placed after the IP header of a network packet. In such a case, the metadata can be exchanged between network policy devices and virtual switches or waypoint network devices, and can include necessary information gathered along waypoint network devices as the network packet traverses through the service chain. For example, metadata can be used to collect necessary information from all waypoints in a service chain. In addition, if a waypoint network device decides to deny a stream of packets, such a deterministic action can immediately be derived, and there would be no need for the network packet to traverse subsequent waypoints, which could be bypassed using the present technique.

In one embodiment, metadata can be stateful for a packet, but stateless between different packets in a stream. For example, stateful metadata can mean that for the same packet, the metadata is updated when visiting each waypoint network device. In contrast, stateless metadata can mean that metadata of a prior packet will not be used by a subsequent packet of the network stream.

In one embodiment, one packet of a network stream may be enough to determine the shortcut rule, and in another embodiment multiple packets of a network stream may be needed to determine the shortcut rule.

In one embodiment, one or more program 440 at block 713 obtains the metadata indicating that a waypoint device has performed deep packet inspection of multiple packets of the network stream in order to find out that a higher level application protocol, such as a business database application, is permitted to communicate between a source virtual machine and a destination virtual machine.

In one embodiment, one or more program 440 at block 713 obtains the metadata showing that one or more previously created shortcut rules should either be updated or terminated.

In one embodiment, one or more program 440 at block 715 determines a shortcut rule that includes a time limit for the shortcut rule to be operational, so that after the time limit, the shortcut rule is deleted.

In one embodiment, one or more program 440 at block 715 determines a shortcut rule by determining which waypoint network devices may be bypassed and which waypoint network devices may not be bypassed, and for example the shortcut rule can specify that an encryption waypoint is not to be bypassed because the networking function of encryption is desired to be always operational on the network stream.

In one embodiment, one or more program 440 at block 715 determines a shortcut rule that reduces network bandwidth used by the network stream if network bandwidth is needed.

In one embodiment, one or more program 440 at block 715 determines a shortcut rule that decreases end to end latency of the network stream, if the network stream requires a decrease in end to end latency.

In one embodiment, metadata can include a header information as depicted in Table A.

TABLE A

Example Metadata Header Format

| Field | Summary |
|---|---|
| Service Chain Identifier (SCID) | Uniquely identifies a particular service chain. |
| Service Index | Initially indicates the number of waypoints along a service chain, and can be decremented by each waypoint. |
| Stream Identifier | Uniquely identifies a particular network stream |
| Action Set | A varying number of type-length-value (TLV) elements indicating action decision information for the stream |

In different embodiments, the different blocks of one or more program 440 can run on the same or different set of processor(s), which can be located on various physical and/or virtual machines. For example, a first block can run on one processor, and a second block can run on a different processor.

Figure 7:
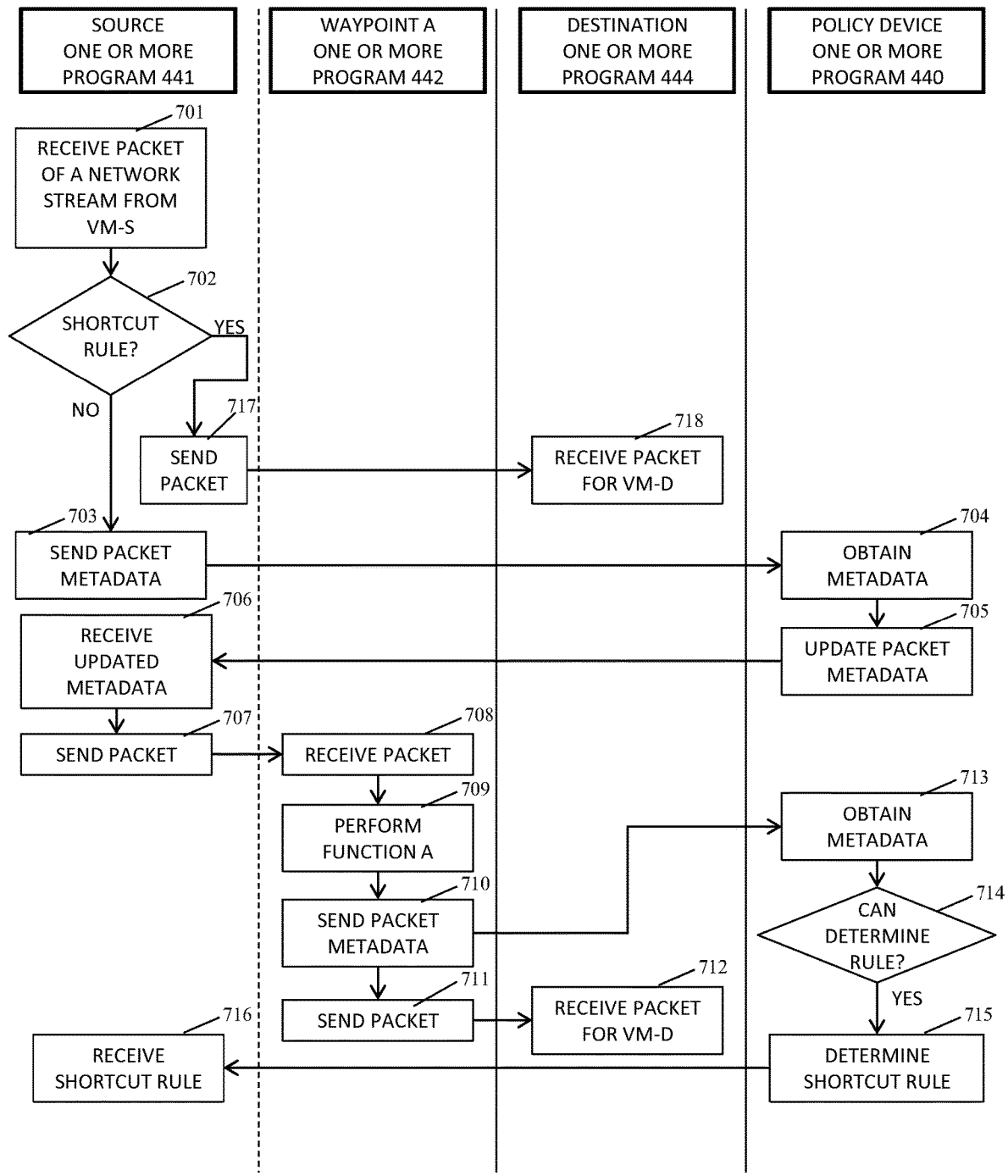
FIG. 7 is a diagram illustrating further aspects of processes for determining shortcut rules, in accordance with one or more aspects set forth herein.

FIG. 7 is a diagram illustrating further aspects of processes for updating networks, in accordance with one or more aspects set forth herein.

FIG. 7 may be used to understand certain details of the present disclosure when a network stream traverses numerous waypoint networks, and will explain how the techniques disclosed herein may be used to overcome such problems by allowing selective bypassing of waypoint network devices subsequent to successful completion of their dedicated network functions. As will be explained below, the techniques disclosed herein will allow for elimination of one or more hops from a network cloud to a waypoint network, as shortcut rules are created, updated, and implemented. In such a case, the benefits of software defined networking, allowing virtualization of the performed networking functions, may be reaped, while mitigating the downside of additional network hops and concomitant bandwidth usage and incremental latency By way of explanation, in FIG. 7, processes are illustrated from the point of view of a network policy device one or more program 440, a source network one or more program 441, waypoint network one or more program 442, and a destination network one or more program 444. In one embodiment, one or more program 440 runs on one or more processor 16 (FIG. 4) of a network policy device 125 (FIG. 5). In one embodiment, one or more program 441 runs on one or more processor 16 (FIG. 4) of a source edge network device 120-S (FIG. 5). In one embodiment, one or more program 442 runs on one or more processor 16 (FIG. 4) of a waypoint network device 120-A (FIG. 5). In one embodiment, one or more program 444 runs on one or more processor 16 (FIG. 4) of a destination edge network device 120-D (FIG. 5). In other embodiments, various programs can run on a different complement of devices. For example, in one embodiment, one or more program 440 and one or more program 441 can both run on source edge network device 120-S (FIG. 5), which can simultaneously service the source network and provide network policy device functions for the entire network. Such a configuration may be desirable to eliminate the deployment of a dedicated network policy device.

FIG. 7 illustrates a network stream having multiple network packets being communicated between a virtual machine VM-S located on a source network and a virtual machine VM-D located on a destination network, and describes an example of determining a shortcut rule for a network stream to bypass a single waypoint network device using metadata. In particular, in one example, the network stream is from IP address and port VM_S_IP_1 on virtual machine VM-S to IP address and port VM_D_IP_1 on virtual machine VM-D, with application protocol P1 (VM_S_IP_1, VM_D_IP_1, and P1 are variables that contain the corresponding information).

In the embodiment of FIG. 7, one or more program 441 (e.g., running on a source edge network device 120-S of FIG. 5) at block 701 receives a packet of a network stream from virtual machine VM-S.

In one embodiment, one or more program 441 at block 702 checks to see if a shortcut rule corresponds to the network stream. Next, one or more program 441 at block 703 sends metadata of the network packet to a network policy device (e.g., network policy device 125 of FIG. 5) if a shortcut rule corresponding to the network stream does not exist.

In one embodiment, one or more program 440 (e.g., running on network policy device 125 of FIG. 5) at block 704 obtains the metadata of at least one network packet of the network stream, for example, by receiving it from the source network. Next, one or more program 440 at block 705 updates the metadata of the network packet and creates a footprint rule to keep track of the network stream. For instance, the footprint rule can include the internet protocol 5-tuple of the network stream, which includes the source IP address, source IP port, destination IP address, destination IP port, and the application protocol.

In one embodiment, one or more program 441 at block 706 receives the updated metadata. Next, one or more program 441 at block 707 sends the network packet of the network stream, after replacing the header with information derived from the updated metadata, to the waypoint A network 110-A (FIG. 5).

In one embodiment, one or more program 442 (e.g., running on waypoint network device 120-A and/or waypoint computing node 130 of FIG. 5) at block 708 receives the network packet of the network stream. Next, one or more program 442 at block 709 performs a networking function A on the network packet of the network stream.

In one example, one or more program 442 at block 709 performs a firewall networking function of admission control, determining whether the network stream should be allowed to reach the destination network.

In one example, one or more program 442 at block 709 performs a load balancing networking function by distributing various network streams to different destination virtual machines located throughout the network.

In one example, one or more program 442 at block 709 performs a networking function of network intrusion detection and/or provision by performing deep packet inspection of numerous packets of the network stream.

In one example, one or more program 442 at block 709 performs a networking function of encrypting network data to ensure network security.

In one embodiment, one or more program 442 at block 710 sends metadata of the network packet to a network policy device. Next, one or more program 442 at block 711 sends the network packet of the network stream to the destination network 110-D (FIG. 5). In one embodiment, one or more program 444 (e.g., running on destination network device 120-D) at block 712 receives the network packet of the network stream.

In one embodiment, one or more program 440 at block 713 obtains metadata of at least another network packet of the network stream, for example, by receiving it from the waypoint A network (e.g., after one or more program 442 at block 710 sent the metadata). Next, one or more program 440 at block 714 recognizes that the network stream of the network packet matches the footprint rule previously created at block 704. Next, one or more program 440 at block 715 determines a shortcut rule for the network stream to bypass waypoint network device 120-A (FIG. 5). In such an example, the shortcut rule is determined using the metadata of the at least another packet of the network stream.

In addition, one or more program 440 at block 715 sends the shortcut rule to the source network. In one embodiment, one or more program 441 at block 716 receives the shortcut rule from the network policy device.

In one embodiment, after the process described above, the following shortcut table is established:

TABLE B

Shortcut Table

| Network Device | Source Address | Destination Address | Protocol | Shortcut |
|---|---|---|---|---|
| Network device 120-S | VM_S_IP_1 | VM_D_IP_1 | P1 | Network 110-D |

By way of explanation, in the shortcut table above, the columns indicate the network device to apply the shortcut rule, the network stream source address (e.g., IP address and port), the network stream destination address (e.g., IP address and port), the network stream protocol, and the shortcut. In the example given, the shortcut table includes a shortcut rule, to be implemented by the source network device 120-S, for the network stream to bypass waypoint network device 120-A (FIG. 5) and be routed directly to network 110-D (FIG. 5). In a fully deployed system, hundreds, thousands, or millions of entries may be present in the shortcut table. For example, the shortcut table can be stored by one or more processor 40 within network policy device 125 (FIG. 5). In one embodiment, the entire shortcut table can be sent to each network device in the software defined network infrastructure. In another embodiment, only relevant portions of the shortcut table may be sent to each network device to minimize overhead.

In one embodiment, since a shortcut rule has been established, the next network packet of the network stream can be used to illustrate the functioning of the technique described herein.

Once again, in one embodiment, one or more program 441 at block 701 receives a packet of a network stream from virtual machine VM-S. Next, one or more program 441 at block 702 checks to see if a shortcut rule corresponds to the network stream, and finds the shortcut rule. Next, one or more program 441 at block 717 sends the network packet of the network stream directly to the destination network 110-D (FIG. 5). In one embodiment, one or more program 444 at block 712 receives the network packet of the network stream. Advantageously, this and subsequent network packets of the network stream may bypass waypoint network device 120-A.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
obtaining, by one or more processor, metadata of at least one packet of a network stream; and
determining, by the one or more processor, a shortcut rule for the network stream to bypass at least one waypoint network, the shortcut rule being determined using the metadata of the at least one packet of the network stream, wherein the determined shortcut rule includes instructions for a source network of the network stream to bypass the at least one waypoint network and wherein the method includes extracting the metadata from a formatted service header of the at least one packet of the network stream, wherein the formatted service header includes the metadata placed after an IP address of the at least one network stream, and wherein the extracted metadata includes a service chain identifier (SCID) that uniquely identifies a particular service chain.

2. The method of claim 1, wherein the obtaining comprises obtaining the metadata from the at least one waypoint network.

3. The method of claim 1, wherein the obtaining comprises obtaining the metadata from multiple packets of the network stream, and the determining comprises using the metadata of the multiple packets of the network stream to determine the shortcut rule.

4. The method of claim 1, wherein the obtaining includes obtaining the metadata from the at least one waypoint network, wherein the metadata includes deep packet inspection information of the at least one packet of the network stream.

5. The method of claim 1, wherein the obtaining includes obtaining the metadata from a firewall device of the at least one waypoint network, and the determined shortcut rule includes instructions for the network stream to bypass the firewall device of the at least one waypoint network.

6. The method of claim 1, wherein the obtaining includes obtaining the metadata from a load balancer device of the at least one waypoint network, and the determined shortcut rule includes instructions for the network stream to bypass the load balancer device of the at least one waypoint network.

7. The method of claim 1, wherein the obtaining includes obtaining the metadata from multiple waypoint networks, and the determined shortcut rule includes instructions for the network stream to bypass the multiple waypoint networks.

8. The method of claim 1, wherein the obtaining comprises obtaining the metadata from a source network of the network stream.

9. The method of claim 1, wherein the determined shortcut rule includes instructions for a source network of the network stream to bypass the at least one waypoint network and route the network stream directly to a destination network.

10. A computer program product comprising:
a computer readable storage medium readable by one or more processing circuit and storing instructions for execution by one or more processor for performing a method comprising:
obtaining metadata of at least one packet of a network stream;
determining a shortcut rule for the network stream to bypass at least one waypoint network, the shortcut rule being determined using the metadata of the at least one packet of the network stream, wherein the determined shortcut rule includes instructions for a source network of the network stream to bypass the at least one waypoint network and wherein the method includes extracting the metadata from a formatted service header of the at least one packet of the network stream, wherein the formatted service header includes the metadata placed after an IP address of the at least one network stream, and wherein the extracted metadata includes a service chain identifier (SCID) that uniquely identifies a particular service chain.

11. A system comprising:
a memory;
one or more processor in communication with the memory; and
program instructions executable by the one or more processor via the memory to perform a method, the method comprising:
  obtaining metadata of at least one packet of a network stream; and
  determining a shortcut rule for the network stream to bypass at least one waypoint network, the shortcut rule being determined using the metadata of the at least one packet of the network stream, wherein the determined shortcut rule includes instructions for a source network of the network stream to bypass the at least one waypoint network and wherein the method includes extracting the metadata from a formatted service header of the at least one packet of the network stream, wherein the formatted service header includes the metadata placed after an IP address of the at least one network stream, and wherein the extracted metadata includes a service chain identifier (SCID) that uniquely identifies a particular service chain.

12. The system of claim 11, wherein the determined shortcut rule is a rule for performance by a source network, wherein the source network by performance of the shortcut rule, bypasses the waypoint network by sending the network stream directly to a destination network.

13. The system of claim 11, wherein the determined shortcut rule is a rule that reduces network bandwidth used by the network stream.

14. The system of claim 11, wherein the determined shortcut rule is a rule that decreases end to end latency of the network stream.

15. The system of claim 11, wherein the determined shortcut rule is a rule that includes a time limit for the shortcut rule to be operational.

16. The system of claim 11, wherein the metadata of the at least one packet of the network stream is extracted from a formatted service header of the at least one network stream, wherein the formatted service header includes the metadata placed after an IP address of the at least one network stream.

17. The system of claim 11, wherein the obtaining includes obtaining the metadata from a computing node that transmits the network stream, wherein the computing node sends the metadata for performance of the obtaining in response to a determining by the computing node that there is no shortcut rule active for the network stream.

18. The system of claim 11, wherein the obtaining includes obtaining the metadata from a computing node that transmits the network stream to a waypoint device, and wherein the method includes sending to the computing node updated data for use by the computing node for replacing a header of a transmitted packet of the network stream based on the updated data, the transmitted packet being transmitted by the computing node to a waypoint device.

19. The system of claim 11, wherein the obtaining includes obtaining the metadata from a computing node that transmits the network stream to a waypoint device, wherein the method includes sending to the computing node updated data and wherein the method includes receiving from the waypoint device second metadata that is changed from the metadata based on the updated data, wherein the determining the shortcut rule includes using the metadata and the second metadata.

20. The system of claim 11, wherein the obtaining includes obtaining the metadata from a computing node that transmits the network stream to a second computing node, wherein the method includes receiving from the second computing node second metadata, wherein the determining the shortcut rule includes using the metadata and the second metadata.

* * * * *